Sheet.1. 2 Sheets

James L. Jackson, Imp^ts in Tables for Emery Grinders.

118017  PATENTED AUG 15 1871  B

Witnesses.  
Fred Haynes  
R. J. Reuben

James L. Jackson

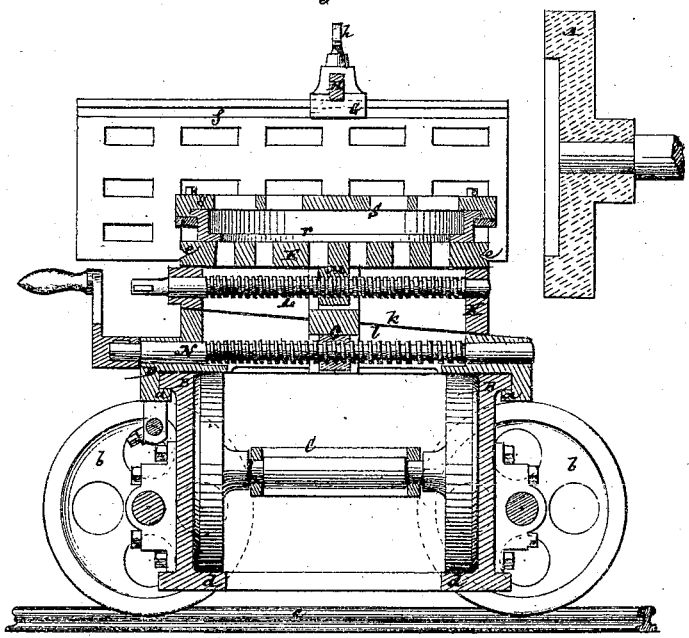

118,017

UNITED STATES PATENT OFFICE.

JAMES L. JACKSON, OF NEW YORK, N. Y.

IMPROVEMENT IN TABLES FOR EMERY-GRINDERS.

Specification forming part of Letters Patent No. 118,017, dated August 15, 1871.

*To all whom it may concern:*

Be it known that I, JAMES L. JACKSON, of the city, county, and State of New York, have invented certain new and useful Improvements in Tables for Emery-Grinders; and I do hereby declare that the following is a full, clear, and exact description of the same, reference being had to the accompanying drawing forming part of this specification.

This invention relates more especially to tables for use in connection with what are termed "face grinders," the grinding-faces of which coincide with the planes of revolution, and which may be emery-wheels or any other suitable grinders besides emery ones, the same being used as a substitute for planers in producing flat surfaces on cast-iron or other metal. The table is used to support and hold the work and present it properly to the revolving face of the grinder. Said table is composed mainly of a horizontal shears, and a carriage traveling thereon. The invention consists in a novel construction of such carriage, whereby its bed may be adjusted higher or lower, as required. When grinding the ends of columns or long pieces of work two tables are used, arranged at a suitable distance apart to support the work at or near its ends, and the shears of each table provided with wheels at their ends to facilitate adjustment of the tables apart, but it will suffice, in this specification, to describe only one table with its attachments. The invention also includes, in combination with either table, a roller frame or truck composed of a series of rollers carried by a suitable frame, and arranged to run in a free and independent manner on inner rails which project from the sides of the shears at or near their bottoms, and so proportioned as to project slightly above the top surfaces of the shears so as to form bearing-surfaces for the carriage as it is run along or adjusted over the shears in direction of their length, and whereby heavy work may be readily moved over the shears of the table or tables in feeding across the face of the grinder, and in setting the work as required. The invention also consists in a combination with the carriage or its bed of a supplementary bed, capable of rotation on the carriage to adapt the table to present varying surfaces, ends, or sides of the work, to the action of the grinder without removing the work.

Figure 2:
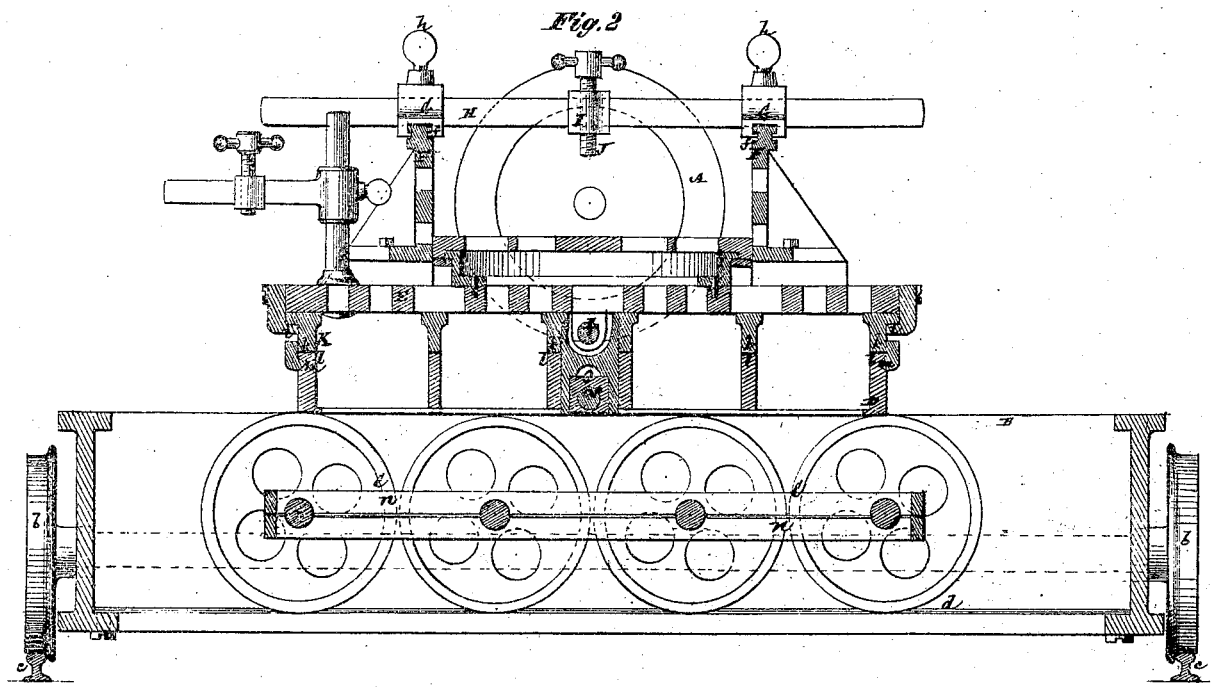
Figure 1:
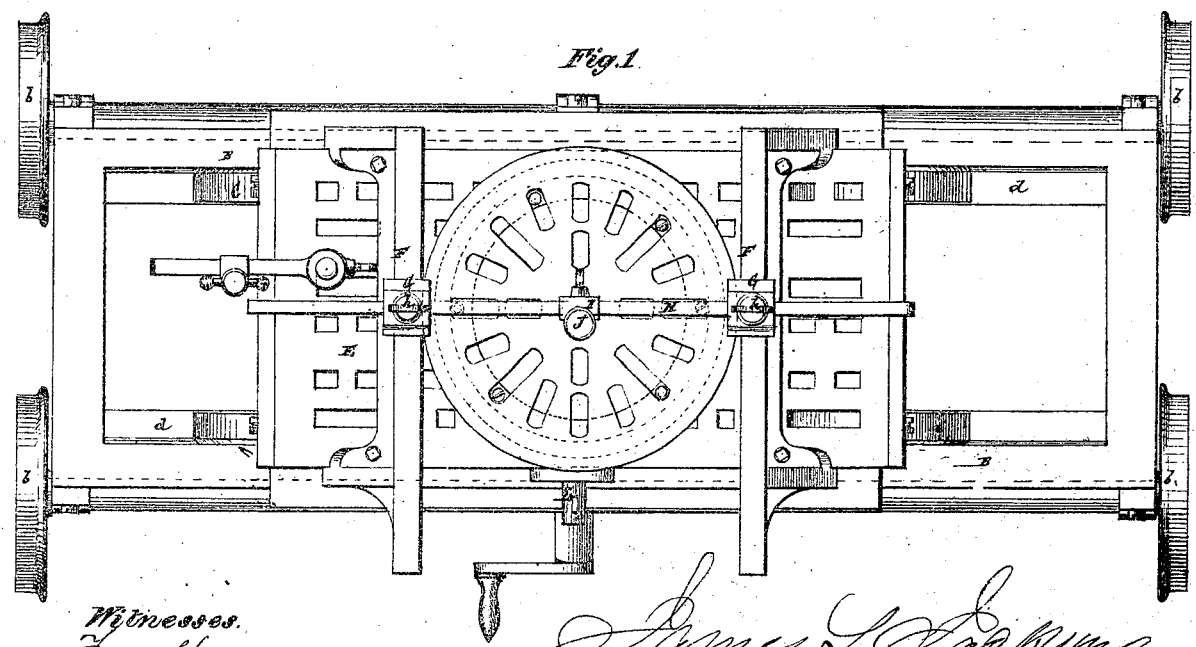

Figure 1 in the drawing is a plan of a table with my improvements. Fig. 2 is a longitudinal vertical section of the same. Fig. 3 is a transverse section thereof.

As the invention relates only to the table, I have not shown any more of the grinder than is necessary to illustrate its position with regard to the table, but have simply shown the emery-wheel A, in Figs. 2 and 3, its face being shown in Fig. 2 and its axial section in Fig. 3. B B indicate the shears, which may be provided at their ends with wheels *b b* to allow of the running and adjustment of the whole table on or along rails *c c* relatively to a second table, arranged at a suitable distance apart, used in support of the work or for otherwise setting the table as required. Within the shears B B is a roller-frame or truck, C C, arranged to run in a free and independent manner on inner rails or planed ledges *d d* which project from the edge of the shears at or near their bottom. The wheels of this roller-frame are of such diameter that they project slightly above the upper surfaces of the shears to allow of the frame D of the carriage to rest on and travel over said wheels as a bearing-surface or surfaces, as the carriage is run along or adjusted over the shears in direction of their length, and parallel with the plane of revolution of the grinding-wheel. The rollers C C of this truck, of which there is any number in a series on both or opposite sides, are carried by a split frame, *n n*, arranged to receive the axles of the rollers in between them. Tongues *a a* are provided on the overhanging edges of the lower frame D of the carriage, to clip upper and outer or laterally-projecting edges of the shears. E is the bed of the carriage, for support of the work to be ground, which bed may carry two upright face-plates, F F. These face-plates have their faces parallel to each other and with the axis of the grinding-wheel, and they are fitted to the bed E with tongues and grooves *e e* to slide lengthwise thereon or at right angles to the movement of the bed over the frame D, and they are grooved horizontally, as shown at *f f*, at or near their upper edges, for the reception of sliding clamps G G, which have inserted through them a bar, H, that straddles the two plates, and which is adjustable in the said clamps to suit their varying distance apart as the plates are set toward or from each other on the bed E. The clamps G G are fitted with set-screws *h h* to secure them to the face-plates when adjusted thereon. The said bar is also fitted with one or more sliding blocks, I, containing upright binding-screws J. The bed E and face-plates F F have numerous slots in them, like the bed-plates of planing-machines and the face-plates of other machines, for the reception of dogs or clamping-bolts by which to secure the work to them. Said face-plates F F are adjustable upon the bed E by hand, and when adjusted may be secured by clamps or dogs applied through the slots of the bed. The bed E does not rest directly upon the lower frame D of the carriage, but upon an intervening frame, K, across which—that is, to and from the grinder—the bed E is made capable of moving, and is guided by end tongues and grooves, $i$ $i$. This movement or adjustment of the bed at right angles to the travel of the latter or its lower frame D upon the shears B B is effected by a screw, L, fitted to bearings in the intervening frame K and to a nut, M, secured under the bed E. The frame K upon which the bed E is thus caused to slide in a crosswise direction is made to rest by a series of inclines, $k$ $k$, upon a series of reverse inclines, $l$ $l$, arranged across the upper portion of the lower frame D, and is made capable of motion over the latter, subject to the guidance of inclined end tongues and grooves $m$ $m$ by means of a screw, N, which is fitted to bearings on the frame D and to a nut, $o$, attached to or carried by the frame K. By turning the screw N the frame K may be moved across the frame D, carrying the bed E with it, and this movement being made on the inclines $l$ $l$ raises or lowers the bed E.

The work to be presented to the rotary grinder may, according to its form or character, be secured to the bed E, above or to either of the face-plates, or to both, or between the face-plates, and with or without the assistance of the binding-screw or screws J on the bar H, and the bed, face-plate, and bar H will, by means of their several adjustments, provide for securing almost any kind of work. The feeding of the work to the grinder will be performed by a movement of the whole carriage on the shears B B, which may be effected by any suitable appliances. The depth of cut is adjusted by the screw L. The inclines $l$ $l$ and $m$ $m$ and screw N serve to vary the height of the bed E. This variation is of especial advantage for facing the ends of taper columns square with the axis, in which operation two machines are used, one end of the column resting on the bed E of one and the other end on the bed E of the other, and the bed on which the smaller end of the column is supported being raised higher than the other to bring the axis of the column to a horizontal line or perpendicular to the plane of the grinding operation.

To enlarge still further the capacity of the table for different kinds of work and variations in the angles or surfaces presented to the grinder I arrange on the bed E a supplementary bed, S, which is composed of a stationary ring or box-part, $r$, that may be secured to the lower or main bed E by screws fitted through an interior lower projecting flange of said ring, and a face-plate, $s$, fitted to overlap and clip an upper outside flange of the ring, and so that the face-plate is free to revolve on and around the stationary ring. The face-plate $s$ has numerous slots in it, like the face-plates of different machines for the reception of dogs or clamping-bolts, by which to secure the work to it, and it may be fitted with an index or pointer arranged, when turning the face-plate, to move over a scale on the exterior of the ring $r$ to facilitate the setting of the work on the face-plate relatively to the grinder, and to present different sides or portions of it thereto without removing the work from its clamped position on the face-plate, as, for instance, in grinding the several sides of a hexagonal or other many-sided figure, or opposite sides or ends of different bodies.

What is here claimed, and desired to be secured by Letters Patent, is—

1. The intervening carriage-frame K, movable in a transverse direction on inclined planes or ways, as described, in combination with the lower frame D running on the shears and the bed E, movable transversely on the intervening frame K, substantially as specified.

2. The combination, with the carriage or its lower frame D, of the roller-truck C, composed of a series of rollers united by a frame at their axles, and arranged to run on lower rails $d$ $d$ of the shears and to project above the top surfaces of the latter, substantially as herein set forth.

3. The revolving supplementary bed S, composed of a face-plate, $s$, and stationary ring or box-part, $r$, in combination with the transversely-movable main bed E and its lower frame or frames running on or along the shears, essentially as described.

JAMES L. JACKSON.

Witnesses:
FRED HAYNES,
R. E. RABEAU.